(No Model.)
J. M. CARR.
BARREL TRUCK.
No. 473,381. Patented Apr. 19, 1892.
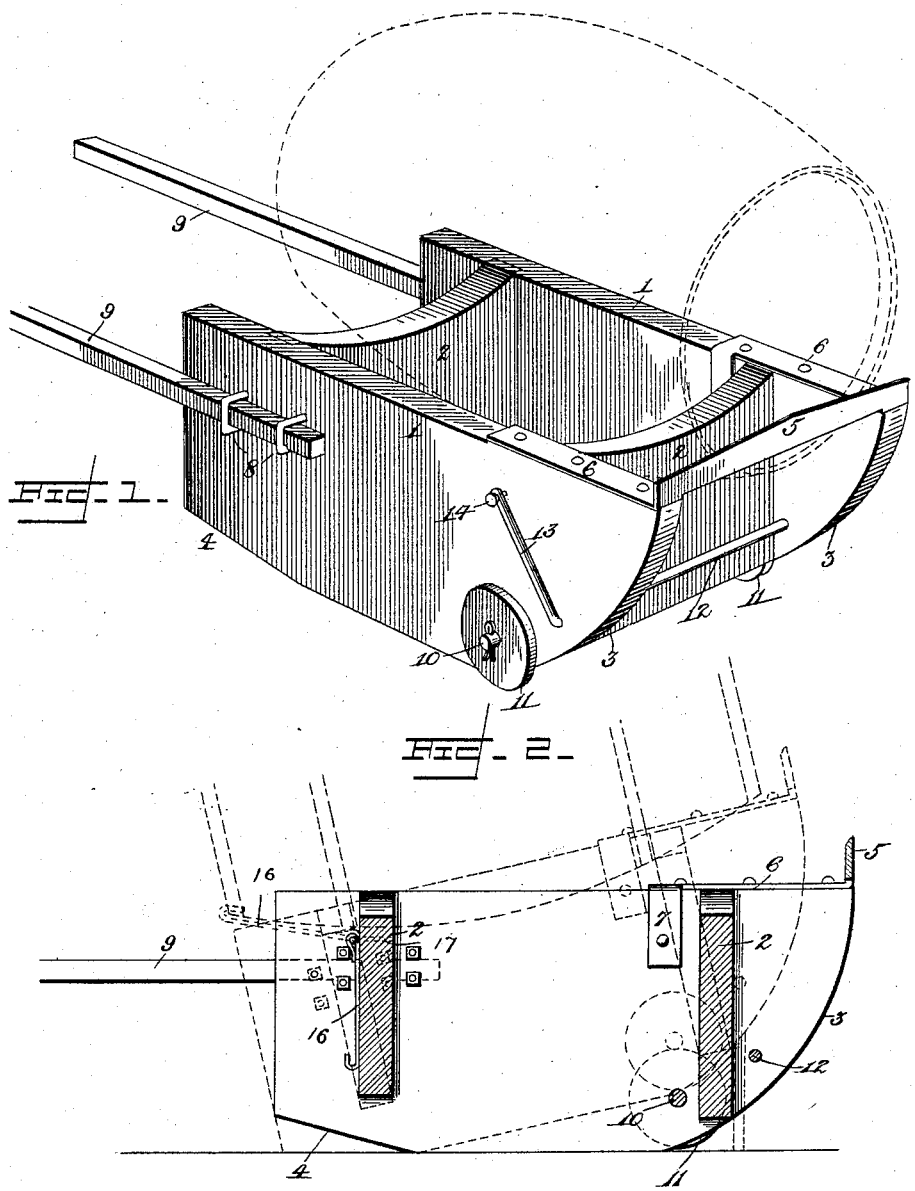
Witnesses:
E. S. Duvall Jr.
W. S. Duvall
Inventor
John M. Carr.
By his Attorneys,
C. A. Snow & Co.

UNITED STATES PATENT OFFICE.

JOHN M. CARR, OF KNOBNOSTER, MISSOURI.

BARREL-TRUCK.

SPECIFICATION forming part of Letters Patent No. 473,381, dated April 19, 1892.

Application filed November 28, 1891. Serial No. 413,369. (No model.)

*To all whom it may concern:*

Be it known that I, JOHN M. CARR, a citizen of the United States, residing at Knobnoster, in the county of Johnson and State of Missouri, have invented a new and useful Barrel-Truck, of which the following is a specification.

This invention relates to barrel-trucks; and the objects in view are to provide a cheap and simple construction of truck adapted to readily take under, elevate, and transport barrels, and to serve as a convenient support for the same for the purpose of retailing or withdrawing their contents.

Other objects and advantages of the invention will appear in the following description, and the novel features thereof will be particularly pointed out in the claims.

Referring to the drawings, Figure 1 is a perspective of a combined truck and stand constructed in accordance with my invention, the same being shown as when used as the former and as supporting a barrel thereon. Fig. 2 is a vertical longitudinal section of the device, the same being shown by dotted lines the position it assumes when serving as a stand.

Like numerals of reference indicate like parts in both the figures of the drawings.

In constructing the combined truck and stand I employ a pair of opposite side bars 1, the same being of suitable length and width, and connect the side bars near their front and rear ends by transverse bars 2, the ends of the bars being let into the side bars 1 or otherwise secured, as may be desired. The lower rear corners of the side bars 1 are curved, as indicated at 3, the curvature extending forwardly about one-third the length of the bars. The front lower corners of the side bars 1 are beveled, as at 4, to form rests. The upper rear corners of the side bars 1 are connected by the transverse metal nose-piece 5, from the ends of which rearwardly extend the terminals 6, bolted to the upper edges of the bars 1, and having their rear extremities inwardly disposed and bent down against and bolted to the inner sides of the side bars, as indicated at 7.

In pairs of staples or keepers 8, located near the front ends and at the outer sides of the side bars 1, removable handles 9 are inserted, by which the truck may be conveniently pushed or pulled. In the opposite side bars there is located a transverse axle 10, the same being slightly in the rear of the lower point or termination of the curved portions of the side bars, and the ends of the axle, which extend beyond the side bars, have mounted thereon small wheels 11, the peripheries of which extend beyond the curved portions 3 of the side bars, but not below the intermediate straight portions or lower edges of the bars.

A rod 12 is loosely journaled in the side bars near their rear ends and has its extremities beyond the bars bent to form supporting-arms 13. (Shown up in Fig. 1 and down in dotted lines in Fig. 2.) When up out of position, the arms are supported by a pin 14, extending laterally from one of the bars 1.

In operation the handles 9 are inserted in the keepers 8 and are elevated by the operator until the wheels 11 arrive in contact with the ground, when the truck may be readily rolled to the barrel. If the barrel be standing, the truck is tilted to near a vertical position, when it rests on the curved portions 3 of the side bars 1. The barrel is now tilted away from the truck, permitting of the introduction of the nose-piece 5 under the lower chine of the barrel. The truck is now swung toward the operator, who may keep his hand upon the barrel, so as to bring the same with the truck, or a holding device, which I will hereinafter explain, may be and preferably is employed for this purpose. If, however, the barrel is lying down, the truck should be rolled to the barrel, inverted and placed upon the same, the before-mentioned holding-hook engaged with the chine of the barrel, and the truck elevated by means of the handles until swung to its proper position, when it may be rolled to any point desired. When the point at which the barrel is to be used is reached, the handles are removed, the truck being lowered to a horizontal position, and the arms 13 released, so that their ends swing down into contact with the ground or floor. When the contents of the barrel become low, the front end of the truck is depressed, so that its beveled edges 4 rest upon the ground or floor and the truck is maintained in its inclined position by the brace-arms 13.

To the front bar 2 I may and preferably do connect, by means of a staple 17 driven therein, a hook 16, designed to swing loosely upon the staple and at its front end to engage with the chines of the barrels and operate in the manner and for the purpose heretofore described.

From the foregoing description, in connection with the accompanying drawings, it will be seen that I have provided a combined truck and barrel stand of great simplicity, strength, and durability, and though adapted to perform the joint functions of a stand or truck may be manufactured at a cost very slightly, if any, greater than an ordinary barrel-stand.

Having described my invention, what I claim is—

1. The herein-described combined truck and stand, the same consisting of the opposite side bars, rest-bars connecting the two, said side bars being provided with handles and having their front ends beveled, as at 4, and their rear ends rounded, as at 3, the axle passed through the side bars, and the wheels mounted on the axle and having their peripheries extended beyond the rounded edges of the side bars, substantially as specified.

2. The herein-described combined barrel stand and truck, the same comprising the opposite side bars having front beveled rest ends 4 and rear rounded corners 3, the axle connecting the side bars, the wheels mounted on the axle and having their peripheries extending beyond the curved ends thereof, the transverse curved supporting-bars 2, the metal nose 5, projecting rigidly from the front ends thereof, the shafts 12, terminating in the arms 13, the supports 14, the keepers 8, and removable handles 9, substantially as specified.

In testimony that I claim the foregoing as my own I have hereto affixed my signature in the presence of two witnesses.

JOHN M. CARR.

Witnesses:
L. C. MULLER,
L. F. CASE.